(12) United States Patent
Zeng et al.

(10) Patent No.: US 11,448,864 B2
(45) Date of Patent: Sep. 20, 2022

(54) OPTICAL SYSTEM AND IMAGE ENLARGEMENT DEVICE

(71) Applicant: GUANGDONG VIRTUAL REALITY TECHNOLOGY CO., LTD., Guangzhou (CN)

(72) Inventors: Hao Zeng, Guangzhou (CN); Daobing Huang, Guangzhou (CN)

(73) Assignee: GUANGDONG VIRTUAL REALITY TECHNOLOGY CO., LTD., Guangzhou (CN)

( * ) Notice: Subject to any disclaimer, the term of this patent is extended or adjusted under 35 U.S.C. 154(b) by 420 days.

(21) Appl. No.: 16/659,593

(22) Filed: Oct. 22, 2019

(65) Prior Publication Data

US 2020/0049964 A1 Feb. 13, 2020

Related U.S. Application Data

(63) Continuation of application No. PCT/CN2017/102146, filed on Sep. 18, 2017.

(30) Foreign Application Priority Data

Aug. 11, 2017 (CN) .......................... 201710684964.6

(51) Int. Cl.
*G02B 17/06* (2006.01)
*G02B 27/01* (2006.01)
*G02B 1/11* (2015.01)

(52) U.S. Cl.
CPC ................ *G02B 17/06* (2013.01); *G02B 1/11* (2013.01); *G02B 27/0172* (2013.01); *G02B 2027/0147* (2013.01)

(58) Field of Classification Search
CPC ........ G02B 27/0172; G02B 2027/0178; G02B 27/0101; G02B 27/017; G02B 2027/011;
(Continued)

(56) References Cited

U.S. PATENT DOCUMENTS 9,632,315 B2 * 4/2017 Smith ................ G02B 27/0172
2016/0091723 A1 3/2016 Rolland et al.

FOREIGN PATENT DOCUMENTS

CN 101359089 A 2/2009
CN 104216118 A 12/2014
(Continued)

OTHER PUBLICATIONS

International Search Report issued in corresponding international application No. PCT/CN2017/102146, dated May 3, 2018 (16 pages).

*Primary Examiner* — Collin X Beatty
*Assistant Examiner* — Grant A Gagnon

(57) ABSTRACT

The embodiments of the disclosure provide an optical system and an image enlargement device. The optical system may include a display and an optical component disposed between the display and a viewing position. The optical component may include a first reflective element and a second reflective element. The first reflective element is configured to receive an incident light emitted from the display. The second reflective element is disposed on a reflected light path of the first reflective element, and configured to receive the incident light reflected by the first reflective element and reflect the reflected incident light to a viewing position. The first reflective element and/or the second reflective element having a function of concentrating light. Therefore, when the user looks at a display of a mobile phone or a terminal, the display is enlarged by the even reflection of the first reflective element and the second reflective element, thereby improving the user experience and comfort.

20 Claims, 9 Drawing Sheets

(58) Field of Classification Search
CPC .......... G02B 27/0132; G02B 5/30; G02B 2027/0118; G02B 27/0138; G02B 17/086; G02B 27/0176; G02B 2027/0123; G02B 27/01; G02B 2027/0187; G02B 2027/014; G02B 27/0149; G02B 17/0848; G02B 2027/0154; G02B 27/283; G02B 2027/013; G02B 2027/015; G02B 27/0093; G02B 27/0081; G02B 2027/0116; G02B 2027/0125; G02B 27/144; G02B 2027/0156; G02B 2027/012; G02B 17/0816; G02B 2027/0174; G02B 5/10; G02B 2027/0134; G02B 2027/0159; G02B 6/00; G02B 17/08; G02B 5/04; G02B 27/0179; G02B 27/145; G02B 2027/0136; G02B 2027/0198; G02B 27/1066; G02B 2027/0127; G02B 2027/0169; G02B 17/0832; G02B 5/3083; G02B 17/0856; G02B 17/0896; G02B 27/0025; G02B 27/0103; G02B 5/32; G02B 27/286; G02B 2027/0143; G02B 2027/0141; G02B 2027/0161; G02B 26/101; G02B 3/08; G02B 2027/0112; G02B 2027/0194; G02B 27/30; G02B 2027/0196; G02B 27/0018; G02B 7/12; G02B 2027/0152; G02B 23/14; G02B 17/0852; G02B 25/001; G02B 2027/0181; G02B 30/56; G02B 6/0035; G02B 2027/0145; G02B 2027/0165; G02B 2027/0185; G02B 5/18; G02B 17/0663; G02B 27/14; G02B 27/1006; G02B 27/28; G02B 5/02; G02B 26/0833; G02B 27/0905; G02B 13/16; G02B 2027/0121; G02B 6/003; G02B 6/34; G02B 23/125; G02B 27/106; G02B 13/06; G02B 26/10; G02B 27/143; G02B 5/045; G02B 19/0028; G02B 27/1033; G02B 5/3066; G02B 13/22; G02B 2027/0129; G02B 27/1086; G02B 6/0056; G02B 17/008; G02B 17/0812; G02B 2027/0107; G02B 27/141; G02B 27/142; G02B 27/4211; G02B 17/0808; G02B 17/0892; G02B 23/12; G02B 27/10; G02B 27/4205; G02B 30/34; G02B 30/35; G02B 5/09; G02B 13/18; G02B 17/0804; G02B 2027/0147; G02B 27/027; G02B 27/1073; G02B 27/123; G02B 27/126; G02B 30/25; G02B 6/0016; G02B 6/06; G02B 6/08; G02B 1/11; G02B 17/0621; G02B 27/022; G02B 27/149; G02B 27/4272; G02B 17/06; G02B 17/0694; G02B 19/0014; G02B 19/0057; G02B 2027/0109; G02B 27/46; G02B 3/0056; G02B 5/28; G02B 5/3058; G02B 6/2773; G02B 7/002; G02B 1/18; G02B 13/007; G02B 17/004; G02B 17/006; G02B 2027/0114; G02B 23/02; G02B 26/0841; G02B 27/0037; G02B 27/0977; G02B 27/148; G02B 3/14; G02B 5/1814; G02B 5/3016; G02B 5/3025; G02B 5/3041; G02B 6/0028; G02B 17/0605; G02B 2027/0163; G02B 25/008; G02B 27/028; G02B 5/0278; G02B 5/08; G02B 5/305; G02B 6/0001; G02B 7/1805; G02B 7/182; G02B 17/02; G02B 17/0657; G02B 2027/0105; G02B 23/10; G02B 26/105; G02B 27/0012; G02B 27/02; G02B 27/0983; G02B 3/0006; G02B 3/0068; G02B 5/12; G02B 6/0038; G02B 6/0055; G02B 6/0076; G02B 6/2706; G02B 6/272; G02B 6/2766; G02B 6/32; G02B 1/14; G02B 13/0055; G02B 17/04; G02B 17/0642; G02B 2027/0158; G02B 2027/0183; G02B 23/243; G02B 26/0858; G02B 27/0068; G02B 27/09; G02B 27/0955; G02B 27/1053; G02B 27/4216; G02B 27/48; G02B 3/00; G02B 30/26; G02B 30/27; G02B 30/52; G02B 5/003; G02B 5/1842; G02B 5/20; G02B 5/208; G02B 7/023; G02B 7/1821; G02B 13/0065; G02B 13/10; G02B 15/00; G02B 17/023; G02B 17/0828; G02B 17/0844; G02B 2005/1805; G02B 23/0808; G02B 26/0825; G02B 27/006; G02B 27/0189; G02B 27/026; G02B 27/0944; G02B 27/102; G02B 27/1046; G02B 27/18; G02B 27/281; G02B 30/24; G02B 5/0257; G02B 5/26; G02B 6/0031; G02B 6/0033; G02B 6/0048; G02B 6/005; G02B 6/0068; G02B 6/0096; G02B 6/2938; G02B 7/28; G02B 7/287; G02B 13/006; G02B 13/146; G02B 19/0061; G02B 19/0066; G02B 21/0032; G02B 23/145; G02B 23/16; G02B 23/18; G02B 26/0816; G02B 26/085; G02B 27/0031; G02B 27/0087; G02B 27/025; G02B 27/0927; G02B 27/0961; G02B 27/1026; G02B 27/4277; G02B 27/44; G02B 3/005; G02B 3/0062; G02B 5/0221; G02B 5/124; G02B 5/285; G02B 6/002; G02B 6/0045; G02B 6/0053; G02B 6/14; G02B 7/04; G02B 7/08; G02B 1/041; G02B 1/10; G02B 13/0015; G02B 13/005; G02B 13/0095; G02B 13/04; G02B 13/14; G02B 15/143507; G02B 17/002; G02B 17/026; G02B 17/045; G02B 17/061; G02B 17/0615; G02B 19/0019; G02B 19/0047; G02B 2006/1213; G02B 23/04; G02B 23/06; G02B 23/08; G02B 25/007; G02B 26/005; G02B 26/06; G02B 27/024; G02B 27/095; G02B 27/0966; G02B 27/0972; G02B 27/0994; G02B 27/1013; G02B 27/104; G02B 27/147; G02B 27/16; G02B 27/285; G02B 27/288; G02B 27/32; G02B 27/4244; G02B 27/646; G02B 3/0037; G02B 3/0087; G02B 3/02; G02B 3/04; G02B 3/06; G02B 30/54; G02B 5/005; G02B 5/1866; G02B 5/1871; G02B 5/1876; G02B 5/1895; G02B 6/0008; G02B 6/0046; G02B 6/0208; G02B 6/04; G02B 6/1228; G02B 6/124; G02B 6/126; G02B 6/262; G02B 6/2726; G02B 6/2733; G02B 6/29317; G02B 6/30; G02B 6/4204; G02B 6/4214; G02B 6/423; G02B 6/4296; G02B 6/4298; G02B 7/06; G02B 1/06; G02B 1/12; G02B 13/00; G02B 13/003; G02B 13/08; G02B 13/143;

G02B 13/24; G02B 15/1421; G02B 15/1425; G02B 15/143; G02B 15/16; G02B 15/177; G02B 17/00; G02B 17/0884; G02B 17/0888; G02B 19/0023; G02B 19/0076; G02B 2006/12104; G02B 2027/0167; G02B 21/0008; G02B 21/0012; G02B 21/22; G02B 23/00; G02B 23/2484; G02B 25/004; G02B 25/02; G02B 26/02; G02B 27/00; G02B 27/0043; G02B 27/0056; G02B 27/0911; G02B 27/40; G02B 27/42; G02B 27/4261; G02B 3/0012; G02B 3/0043; G02B 3/12; G02B 30/30; G02B 30/36; G02B 30/40; G02B 5/001; G02B 5/0242; G02B 5/0284; G02B 5/0858; G02B 5/136; G02B 5/1852; G02B 5/1861; G02B 5/205; G02B 5/3033; G02B 5/3091; G02B 6/0011; G02B 6/0018; G02B 6/0026; G02B 6/0036; G02B 6/0043; G02B 6/0058; G02B 6/006; G02B 6/0095; G02B 6/29373; G02B 6/4206; G02B 6/4249; G02B 7/004; G02B 7/005; G02B 7/02; G02B 7/10; G02B 7/1822; G02B 9/16; G02B 1/005; G02B 1/02; G02B 1/04; G02B 13/0035; G02B 13/004; G02B 13/0075; G02B 13/009; G02B 13/26; G02B 15/14; G02B 15/144513; G02B 15/144515; G02B 17/0824; G02B 17/084; G02B 19/0004; G02B 19/0033; G02B 19/0052; G02B 19/0071; G02B 2006/12069; G02B 2006/12083; G02B 2006/12102; G02B 2006/12107; G02B 21/002; G02B 21/004; G02B 21/0064; G02B 21/008; G02B 21/084; G02B 21/18; G02B 2207/117; G02B 2207/123; G02B 23/105; G02B 23/2407; G02B 23/2423; G02B 23/2446; G02B 25/04; G02B 26/00; G02B 26/001; G02B 26/008; G02B 26/026; G02B 26/04; G02B 26/08; G02B 26/12; G02B 26/123; G02B 26/124; G02B 26/125; G02B 26/126; G02B 27/0075; G02B 27/021; G02B 27/06; G02B 27/0933; G02B 27/0938; G02B 27/108; G02B 27/1093; G02B 27/20; G02B 27/34; G02B 27/36; G02B 27/4222; G02B 27/4227; G02B 27/4233; G02B 27/4255; G02B 27/4266; G02B 27/4283; G02B 27/4288; G02B 27/62; G02B 27/64; G02B 27/644; G02B 3/0018; G02B 3/0031; G02B 3/0075; G02B 3/10; G02B 30/00; G02B 30/10; G02B 30/20; G02B 30/29; G02B 30/37; G02B 5/008; G02B 5/0215; G02B 5/0252; G02B 5/0263; G02B 5/0294; G02B 5/0816; G02B 5/0833; G02B 5/128; G02B 5/1809; G02B 5/1919; G02B 5/22; G02B 5/23; G02B 5/286; G02B 5/287; G02B 5/289; G02B 6/0003; G02B 6/0005; G02B 6/0006; G02B 6/001; G02B 6/0015; G02B 6/0023; G02B 6/0025; G02B 6/0051; G02B 6/0061; G02B 6/0078; G02B 6/0081; G02B 6/02085; G02B 6/10; G02B 6/12; G02B 6/122; G02B 6/1225; G02B 6/1245; G02B 6/2817; G02B 6/2861; G02B 6/2931; G02B 6/29311; G02B 6/29313; G02B 6/29316; G02B 6/29323; G02B 6/29329; G02B 6/29358; G02B 6/29361; G02B 6/29362; G02B 6/29365; G02B 6/29371; G02B 6/29383; G02B 6/327; G02B 6/3504; G02B 6/3522; G02B 6/353; G02B 6/354; G02B 6/3552; G02B 6/3566; G02B 6/3572; G02B 6/362; G02B 6/3636; G02B 6/3652; G02B 6/3676; G02B 6/3692; G02B 6/389; G02B 6/4207; G02B 6/4212; G02B 6/4215; G02B 6/4221; G02B 6/4224; G02B 6/4232; G02B 6/4239; G02B 6/4256; G02B 6/426; G02B 6/4292; G02B 7/001; G02B 7/006; G02B 7/007; G02B 7/008; G02B 7/021; G02B 7/022; G02B 7/09; G02B 7/102; G02B 7/181; G02B 7/1828; G02B 9/02; G02B 9/12

USPC .......................................................... 359/631

See application file for complete search history.

(56) References Cited

FOREIGN PATENT DOCUMENTS

| CN | 204613516 U | 9/2015 |
| CN | 106226909 A | 12/2016 |

* cited by examiner

OPTICAL SYSTEM AND IMAGE ENLARGEMENT DEVICE

CROSS-REFERENCE TO RELATED APPLICATION

This application is a continuation application of International Application No. PCT/CN2017/102146, filed on Sep. 18, 2017, which claims priority to Chinese Patent Application No. 201710684964.6, filed on Aug. 11, 2017. The disclosures of the aforementioned patent applications are hereby incorporated by reference in their entireties.

TECHNICAL FIELD

The present disclosure relates to a field of display technology, and particularly relates to an optical system and an image enlargement device.

BACKGROUND

With the increasing pursuit of material life, people are increasingly demanding the experience of using various products, for example, consumables, electronic devices, and the like. When watching a video using a mobile phone or a tablet, etc., the video that the user wishes to output is become large enough and clear.

SUMMARY

The present disclosure provides an optical system and an image enlargement device, to solve the problem mentioned above.

In a first aspect, the embodiments of the present disclosure provide an optical system, the optical system may include a first reflective element and a second reflective element. The first reflective element is configured to receive an incident light emitted from a display. The second reflective element is disposed on a reflected light path of the first reflective element, and configured to receive the incident light reflected by the first reflective element and reflect the reflected incident light to a viewing position. The first reflective element and/or the second reflective element having a function of concentrating light.

In a second aspect, the embodiments of the present disclosure optionally provide an optical system, the optical system may include a display and an optical component disposed between the display and a viewing position. The optical component may include a first reflective element and a second reflective element. The first reflective element is configured to receive an incident light emitted from the display. The second reflective element is disposed on a reflected light path of the first reflective element, and configured to receive the incident light reflected by the first reflective element and reflect the reflected incident light to a viewing position. The first reflective element and/or the second reflective element having a function of concentrating light.

In a third aspect, the embodiments of the present disclosure optionally provide an image enlargement device, including a left eye module corresponding to a left eye and a right eye module corresponding to a right eye. Each of the left eye module and the right eye module may include a first reflective module and a second reflective module. The first reflective module may be composed of a plurality of first reflective elements. Reflective surfaces of the plurality of the first reflective elements constitute a reflective surface of the first reflective module. The second reflective module is composed of the plurality of second reflective elements, and reflective surfaces of the plurality of second reflective elements constitute a reflective surface of the second reflective module. The second reflective module is disposed on a reflected light path of the first reflective module, the second reflective module is configured to reflect a light reflected by the first configured to reflect group to a viewing position of the corresponding eye.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION OF PREFERRED EMBODIMENTS

Figure 1:
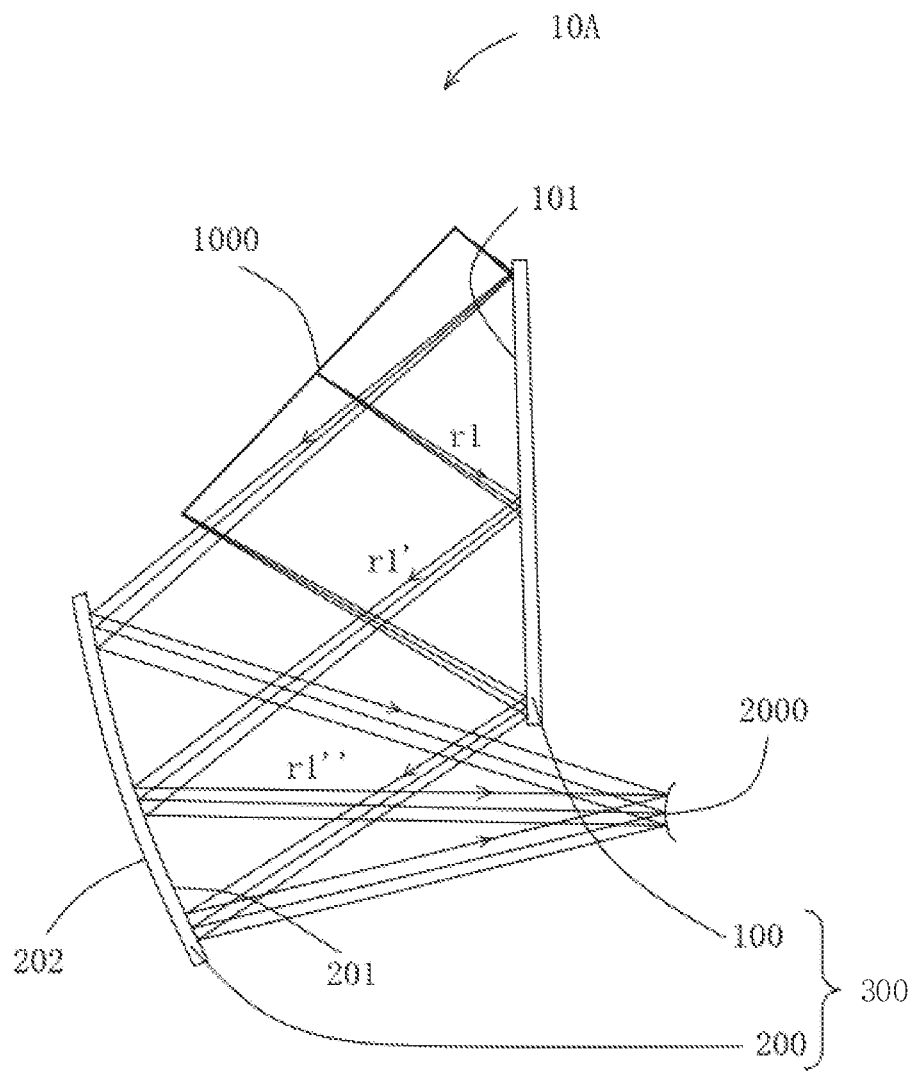
FIG. 1 is a schematic structural view of an optical system according to a first embodiment of the present disclosure.

The technical solutions in the embodiments of the present disclosure are described in conjunction with the drawings in the embodiments of the present disclosure. It is obvious that the described embodiments are only a part of the embodiments of the present disclosure, and not all embodiments. All other embodiments obtained by the ordinary skilled in the art based on the embodiments in the present disclosure without the creative work are all within the scope of the present disclosure.

It should be noted that similar reference numerals and letters indicate similar items in the following figures. Therefore, once an item is defined in a drawing, it is not necessary to further define and explain it in the subsequent drawings. Also, in the description of the present disclosure, the terms "first", "second", and the like are used merely to distinguish a description, and are not to be construed as indicating or implying a relative importance.

Referring to FIG. 1, an optical system is provided according to an embodiment of the present disclosure. The optical system 10A may include a display 1000 and an optical component 300, the optical component 300 is disposed between the display 1000 and user's eyes 2000.

The display 1000 is configured to display an image for viewing by user via the optical component 300. The display 1000 may be a display of a smart terminal, for example, a display of a mobile phone, a tablet computer, a display of a multimedia video, a picture player such as an MP4 player, or the like.

In some embodiments, the display 1000 may be a display of a display capable of displaying multimedia information, such as video, image or the like. Specifically, the smart terminal or the computer can transmit contents to the display by means of wired or wireless transmission, and display the content on the display.

In some embodiments, the display may be a display panel of a projection virtual reality display system. The projection virtual reality display system may include a projection device connected to a smart terminal or computer in a wired or wireless way, which is configured to receive multimedia information sent from the smart terminal or computer. The multimedia information is projected onto the display panel, and displayed by the display panel. The display panel may be a scatter plate, and the scatter plate may be transmissive or reflective. When the scatter plate is transmissive, the scatter plate is located between the projection device and the optical component 300, the image projected by the projection device is transmitted through the scatter plate and output after scattering by the scatter plate. When the scatter plate is reflective, the scatter plate is disposed opposite to the projection device, the light output from the projection device is reflected and scattered by the scatter plate, and direct toward the optical component 300.

It should be noted that, the display 1000 can display contents in different forms according to different scenes used by the optical component 300, which will be described in following embodiments.

The optical component may include a first reflective element 100 and a second reflective element 200. The first reflective element 100 is configured to receive an incident light r1 emitted from the display 1000. The first reflective element 100 includes a reflective surface 101, which may be formed by coating a reflective film on one surface of the first reflective element 100. The material of the reflective film may be, but not limited to, aluminum or silver. Shape of the surface of the first reflective element 100 may be a plane, a spherical surface, or an aspherical surface. The first reflective element 100 can be a plane mirror when the shape of the surface of the first reflective element 100 is a plane mirror, and the first reflective element 100 can be a spherical mirror or an aspherical mirror when the shape of the surface of the first reflective element 100 is a spherical surface or an aspherical surface. In addition, the distance and angle between the display 1000, the first reflective element 100, and the second reflective element 200 need to be adaptively adjustment when the shape of the surface of the first reflective element 100 is selected from the different shapes. The reflective surface 101 of the first reflective element 100 facing toward out-light surface of the display 1000.

The second reflective element 200 is disposed on a reflected light path of the first reflective element 100, and configured to receive a reflected light r1' reflected by the first reflective element 100, and reflect the reflected light r1' to a viewing position. The viewing position is a preset position, that is, an observation point when user using the system, for example, the viewing position may be a position of user's eye 2000. The viewing position has different implementation manners in different application scenarios which will be described in the following embodiments specifically.

The second reflective element 200 includes a first surface 201 and a second surface 202. The first surface 201 faces toward the first reflective element 100, which is configured to receive the light reflected by the first reflective element 100 and reflect the light to the user's eye 2000. The shape of the surface of the second reflective element 200 is selected from one of a spherical surface and a non-spherical surface. In an implementation, the shape of the surface of the second reflective element 200 may be a non-spherical surface. Moreover, the first reflective element 100 and the second reflective element 200 may be made of optical plastics, for example, made of polymethyl methacrylate (PMMA) material.

It should be noted that, the incident light may be reflected in a direction perpendicular to the reflecting surface of the reflective element when the shape of the surface of the reflective element is a plane, the incident light may be reflected in a manner of convergence or divergence when the shape of the surface of the reflective element is a spherical surface or a non-spherical surface. It is depending on whether the reflective element is concave or convex, the incident light can be converged when the reflective element is concave, and the incident light can be diverged when the reflective element is convex.

In addition, in order to enable the user to watch an enlarged image of the display 1000 when using the optical component 300, at least one of the first reflective element 100 and the second reflective element 200 needs to have a function of light converging. In some embodiments, the second reflective element 200 has a function of light converging, and the first reflective element 100 may have a function of light converging or may not have a function of light converging.

In one exemplary, the first reflective element 100 is a plane mirror, and the second reflective element 200 is a concave mirror with aspherical surface. Assuredly, the first reflective element 100 may be a concave mirror or a convex mirror, the light reflected by the first reflective element 100 can be converged and reflected by the second reflective element 200, and can be entered into user's eyes 2000, such that the user can watch an enlarged image.

The surface of the first reflective element 100 and the surface of the second reflective element 200 satisfy the following condition:

$$Z = \frac{cy^2}{1 + sqrt(1 - (1+k)c^2y^2)} + a_1 y^2 + a_2 y^4 + a_3 y^6 + a_4 y^8 + a_5 y^{10} + a_6 y^{12} + a_7 y^{14} + a_8 y^{16}.$$

Wherein, z is an element height of the reflective element, c is a curvature of the reflective element, k is a conic coefficient of the reflective element, y is an aperture of the reflective element, and a1 to a8 are the aspheric high order coefficients of the reflective element.

The incident light r1 emitted from the image displayed on the display 1000 are reflected by the first reflective element 100 and converged by the second reflective element 200, and then enter into the user's eyes, such that the user can watch an enlarged image. As mentioned above, the first reflective element 100 is a total reflection mirror, in order to reduce the attenuation of light energy, at least one of the first reflective element 100 and the second reflective element 200 may be a total reflection mirror. Moreover, the optical component 300 and the optical system described above do not use a traditional lens for amplification, thereby avoiding defects such as chromatic aberration or high process requirements of the traditional element and improving the user experience. Meanwhile, in the above reflection process of the incident light r1, the traditional element is not used, thereby avoiding using software to process optical aberrations such as chromatic aberration and deformation. The device adopts the principle of even reflection, and avoiding requiring mirror processing by software. Moreover, the present disclosure also reduces power consumption and software processing difficulty on the basis of realizing the amplification of an image.

In some embodiments, the optical system can be applied to various fields such as virtual reality, augmented reality, mixed reality, magnifying glasses, and the like. In one exemplary, in order to apply the above optical component 300 to the fields of augmented reality and mixed reality, the second reflective element 200 can be partially transparent. Specifically, a first surface 201 of the second reflective element 200 is provided with a first reflective film that can partially reflect a light and partially transmit the light, and the ratio of the light transmission and the light reflection is not limited. In an example embodiment, the ratio of light transmission and light reflection is 1:1, that is, the first reflective film is a transflective film.

In some embodiments, in order to increase the optical effect such as the intensity of the transmitted light of the light transmitting portion, an anti-reflection film may be provided on the second surface 202 of the second reflective element 200.

Position, angle and distance relationship between the first reflective element 100 and the second reflective element 200 will be described below in two cases. It should be noted that when the relationship between the first reflective element 100 and the second reflective element 200 is described, a position of the display 1000 and a position of the user's eyes need to be taken as reference points, but it should not be understood as a limitation to an installation position and angle of the optical component 300 of the present disclosure.

Figure 2:
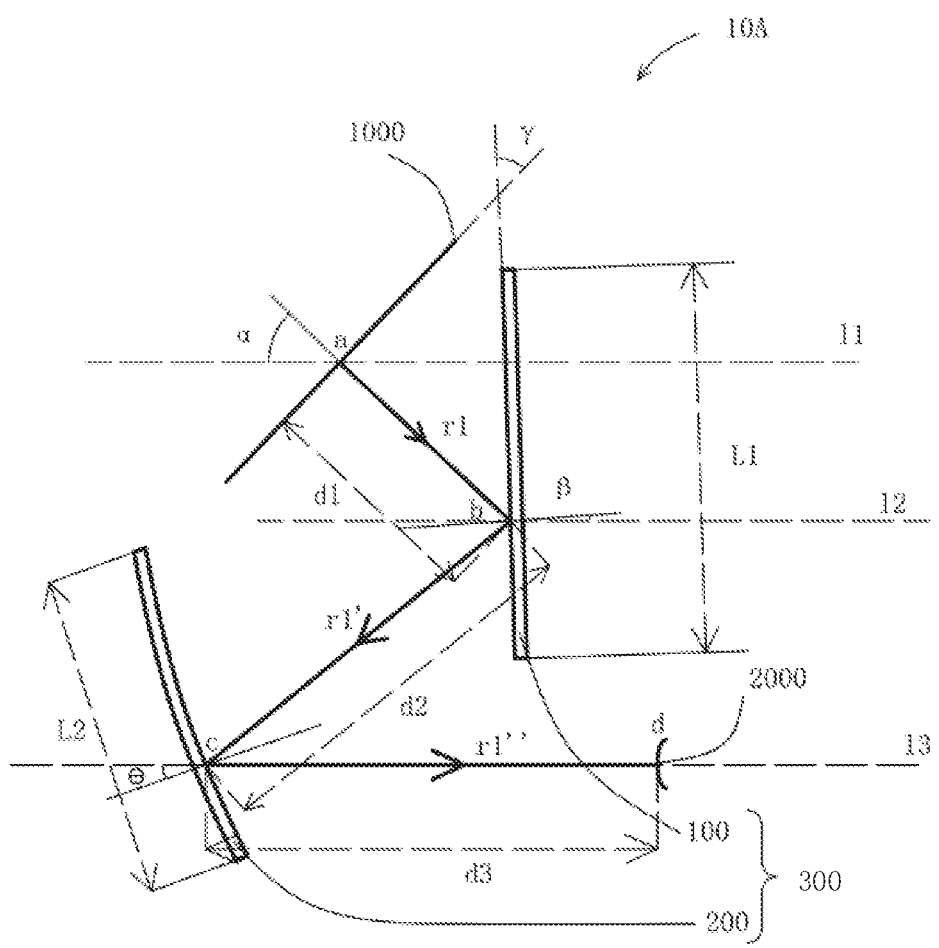
FIG. 2 is a view showing a positional relationship of each component of the optical system according to the first embodiment of the present disclosure.

Referring to FIG. 2, a position relationship between the first reflective element 100 and the second reflective element 200 in the optical component 300 is provided according to an embodiment of the present disclosure, the surface of the display 1000 is tilted toward the position of the user's eyes 2000).

An incident light r1 can be emitted from the center point a of the display 1000, which perpendicular to the surface of the display 1000, and entered into a first incident point b of the first reflective element 100, a reflected light r1' reflected by the first reflective element 100 reflecting the incident light r1 can be obtained, and entered into a second incident point c of the second reflective element 200. The reflected light r1' can be reflected by the second reflective element 200, and a reflected light r1" can be obtained. The reflected light r1" can be entered into a position d of the user's eye 2000 from the second incident point c. For ease of description, the center point a, the first incident point b, and the second incident point c of the display 1000 are represented as a point.

In an exemplary, a horizontal line passing through the center point a of the display 1000 can be defined as a first horizontal line l1, a horizontal line passing through the first incident point b of the first reflective element 100 can be defined as a second horizontal line l2, and a horizontal line passing through the second incident point c of the second reflective element 200 can be defined as a third horizontal line l3. The distance between the center point a of the display 1000 and the first incident point b of the first reflective element 100 is a first distance d1, the distance between the first incident point b and the second incident point c is a second distance d2, and the distance between the second incident point c and the position d of the user's eye is a third distance d3. The angle between a normal line at the position of the center point a of the display 1000 and the first horizontal line l1 is a first angle $\alpha$, the angle between a normal line at the position of the first incident point b of the first reflective element 100 and the second horizontal line l2 is a second angle $\beta$, and the angle between a normal line at the position of the second incident point c of the second reflective element 200 and the third horizontal line l3 is a third angle $\theta$.

When the angle between the surface of the display 1000 and the first horizontal line l1 is less than 90 degrees, that is, the angle between the surface of the display 1000 and the first horizontal line l1 is an acute angle, the first distance d1 ranges from 20 to 60 mm, the second distance d2 ranges from 40 to 100 mm, and the third distance d3 ranges from 70 to 110 mm. The first angle $\alpha$, the second angle $\beta$, and the third angle $\theta$ are acute angles. An angle $\gamma$ between the surface of the display 1000 and the reflective surface of the first reflective element 100 is equal to a sum of the first angle $\alpha$ and the second angle $\beta$, that is, $\gamma=\alpha+\beta$. In one embodiment, the first distance d1 can be 48 mm, the second distance d2 can be 78.5 mm, and the third distance d3 can be 90 mm. The first angle $\alpha$ can be 43 degrees, the second angle $\beta$ can be 2 degrees, the angle $\gamma$ between the surface of the display 1000 and the reflective surface of the first reflective element 100 can be 45 degrees, and the third angle $\theta$ can be 19 degrees. A length L1 of the first reflective element can be 81 mm, and a length L2 of the second reflective element can be 67.5 mm.

The first horizontal line l1, the second horizontal line l2, and the third horizontal line l3 are parallel. The normal direction of the first reflective element 100, the normal direction of the second reflective element 200, and the normal direction of the display 1000 are not parallel, that is, the extension direction are inconsistent. The position of the first reflective element 100 and the second reflective element 200 do not interfere with the images in the both end portions of the display 1000.

Figure 3:
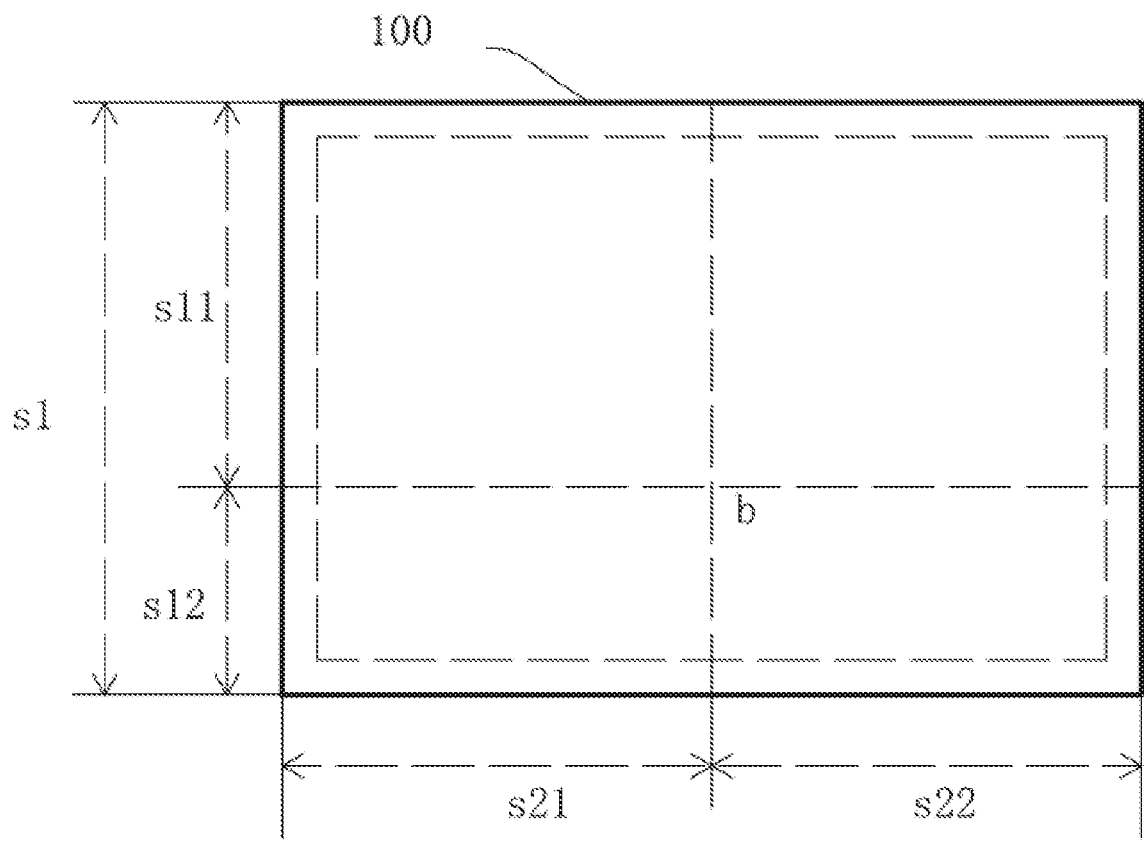
FIG. 3 is a schematic structural view of a first reflective element according to the first embodiment of the present disclosure.

As shown in FIG. 3, a structural view of the first reflective element 100 is illustrated. The reflective surface 101 of the first reflective element 100 is a rectangular surface. The first incident point b is located below the center point of the reflective surface 101 of the first reflective element 100, and the area in the dotted rectangular frame is an effective area of the reflective surface 101 of the first reflective element 100. In one embodiment, length of the first reflective element 100 is 126 mm, and width of the first reflective element 100 is 81 mm. The first incident point b divides the width of the first reflective element 100 into a first width s11 and a second width s12, the length of the first reflective element 100 is divided into a first length s21 and a second length s22 by the first incident point b, wherein the first width s11 can be 52 mm, the second width s12 can be 29 mm, and the first length s21 and the second length s22 are 63 mm.

Figure 4:
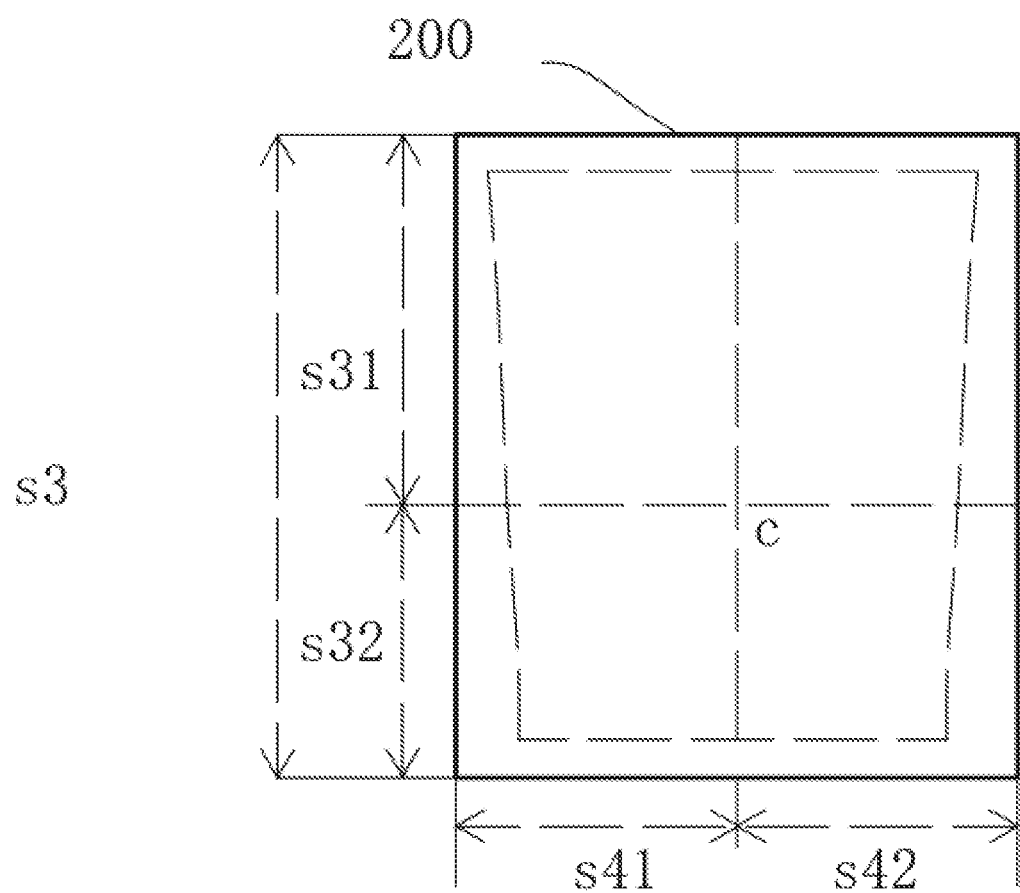
FIG. 4 is a schematic structural view of a second reflective element according to the first embodiment of the present disclosure.

As shown in FIG. 4, a structural view of the second reflective element 200 is illustrated. The area in the dotted line frame is an effective area of the second reflective element 200. The second reflective element 200 is an aspherical concave mirror. The second incident point c of the second reflective element 200 is located below a center point of the second reflective element 200, which divides the width of the second reflective element 200 into a third width s31 and a fourth width s32, and divides the length of the second reflective element 200 into a third length s41 and a fourth length s42, wherein the third width s31 can be 39 mm, the fourth width s32 can be 28.5 mm, the third length s41 can be 29 mm, and the fourth length s42 can be 29 mm.

Figure 5:
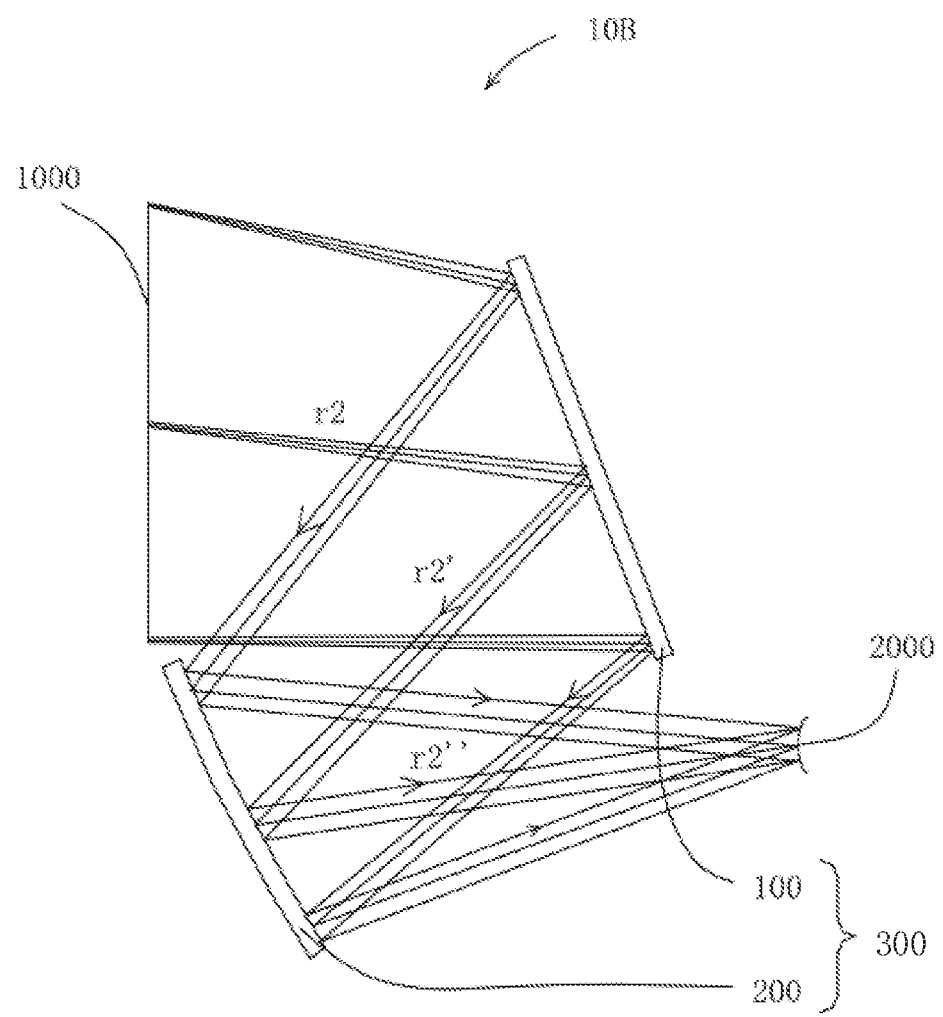
FIG. 5 is a schematic structural diagram of an optical system according to a second embodiment of the present disclosure.
Figure 6:
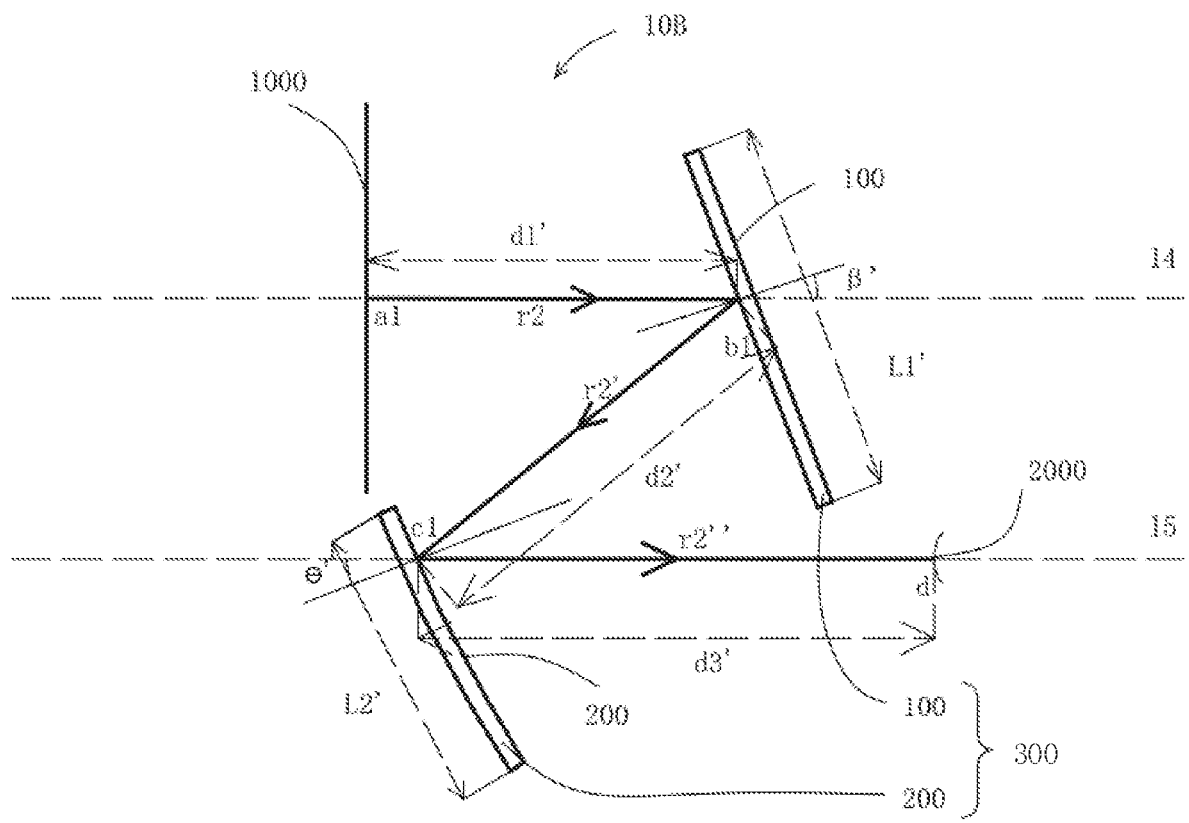
FIG. 6 is a view showing a positional relationship of each component of the optical system according to the second embodiment of the present disclosure.

When the angles between any two of the display 1000, the first reflective element 100, and the second reflective element 200 are changed, the position relationship of the display 1000, the first reflective element 100, and the second reflective element 200 may also be changed correspondingly; as shown in FIG. 5 and FIG. 6. FIG. 5 illustrates an optical system 10B according to another embodiment. What is different from the embodiment shown in FIG. 2, in this embodiment, the surface of the display 1000 is perpendicular to a horizontal line through a viewing position. Specifically, the surface of the display 1000 is perpendicular to a horizontal line passing through the user's eyes 2000. Referring to FIG. 6, a position relationship of each component in the optical system 10B is provided, the second horizontal line changes to the position of 14, and the third horizontal line changes to the position of 15. An incident light r2 is emitted from the point a1 of the surface of the display 100, which perpendicular to the surface of the display 1000. An angle between the incident light r2 and the second horizontal line is changed, such that the intersection of the light r2 with the first reflective element 100 is changed. The first incident point of the first reflective element 100 is changed to point b1, the second incident point of the second reflective element 200 is changed to point c1, and the surface of the display 1000 is perpendicular to the third horizontal line. In some embodiments, the first distance d1' ranges from 30 to 90 mm, the second distance d2' ranges from 40 to 100 mm, and the third distance d3' ranges from 70 to 110 mm. The second angle β' and the third angle θ' are both acute angles. As an example, the first distance d1' can be 65 mm, the second distance d2' can be 74.3 mm, the third distance d3' can be 90 mm, the second angle β' can be 20 degrees, and the third angle θ' can be 25 degrees. A length L1' of the first reflective element can be 68 mm, and a length L2' of the second reflective element can be 50 mm.

It should be noted that, the values of the first distance, the second distance, the third distance, the first angle, the second angle, and the third angle may be set according to actual needs, if an image of the display 1000 converged to the position of the user's eye 2000 by the reflection of the first reflective element 100 and the second reflective element 200 can be ensured.

The optical path of the center point of the display 1000, the first incident point and the second incident point described above is an optical axis of the optical system. The display 1000, the first reflective element 100 and the second reflective element 200 are disposed along the optical axis of the optical system. The center point of the display 1000 is located on the optical axis of the optical system, such that the first reflective element 100 and the second reflective element 200 do not interfere with the out-light from the display 1000.

In some embodiments, the optical axis of the first reflective element 100 is a vertical line of the geometric center of the first reflective element 100, and the optical axis of the second reflective element 200 is a vertical line of the geometric center point of the second reflective element 200. The extension direction of the vertical line of the first reflective element 100 is different from the extension direction of the vertical line of the display 1000, the extension direction of the optical axis of the first reflective element 100 is different from the extension direction of the optical axis of the second reflective element 200. Therefore, when a light emitted from the display 1000 is reflected by the first reflective element 100 and the second reflective element 200, since the extension directions of the optical axes of the reflective elements are different, there is no interference occurs between the lights, and the quality of the amplification image can be ensured. Since the optical axis of the first reflective element 100, the optical axis of the second reflective element 200, and the perpendicular direction of the surface of the display 1000 are different from each other, the space occupied by the first reflective element 100 and the second reflective element 200 can be reduced to some extent. When the optical component 300 is applied in products of virtual reality (VR), augmented reality (AR), mixed reality (MR) or magnifying glasses, the overall size of the related products can be made smaller to facilitate carrying or using by users.

Figure 7:
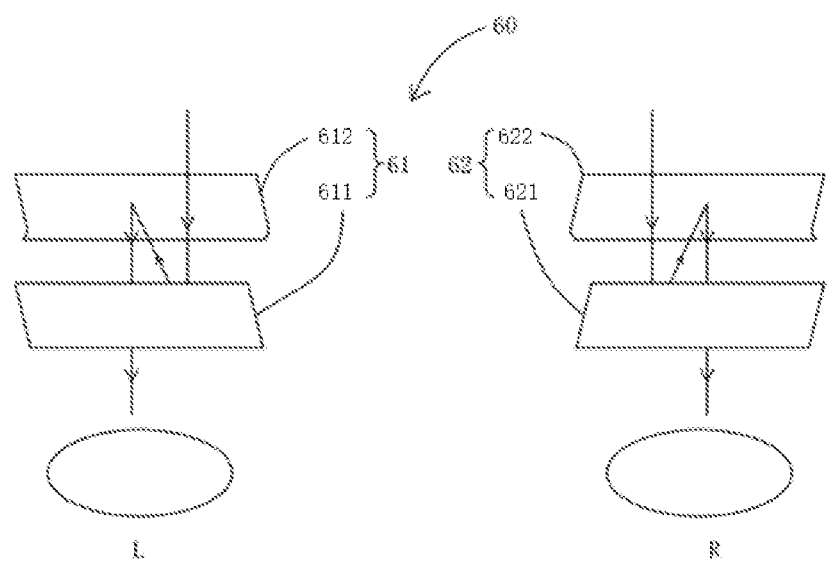
FIG. 7 is a schematic structural diagram of an image enlargement device according to an embodiment of the present disclosure.

When the above-mentioned optical component 300 is applied in products of VR, AR, MR or magnifying glasses, a device for a left eye and a right eye need to be provided separately. Referring to FIG. 7, an image enlargement device 60 is provided. The image enlargement device 60 includes a left eye module 61 and a right eye module 62, L indicates a position of a left eye, and R indicates a position of a right eye. The left eye module 61 is disposed at a position corresponding to the left eye of user, and the right eye module 62 is disposed at a position corresponding to the right eye of user.

The left eye module 61 is configured to enlarge an image and project the enlarged image into the left eye of a user. Specifically, the left eye module 61 includes a first reflective module 611 and a second reflective module 612.

The first reflective module 611 is configured to receive an image of an area in the display 1000 for viewing by the left eye. Specifically, the first reflective module 611 can include one or more first reflective elements 100.

In some embodiments, the first reflective module 611 may be composed of a plurality of first reflective elements 100, the reflective surface of the first reflective module 611 is composed of the reflecting surfaces 101 of the plurality of the first reflecting element 100. In an exemplary, adjacent edges of plurality of first reflective elements 100 are bonded together to form an integral reflective element. Alternatively, the plurality of first reflective elements 100 are not in contact with each other and are separated by a specific distance. The incident light emitted from the display 1000 can be superimposed by the reflection of the plurality of first reflective elements 100, such that the intensity or brightness of the incident light can be improved to a certain extent, and the quality of the light passing through the first reflective module 611 can be ensured.

The second reflective module 612 is disposed on a reflected light path of the first reflective module 611, and is configured to reflect a light of the image reflected by the first reflective module 611 into a viewing position corresponding to the second reflective module 612. When the user uses the image enlargement device, the viewing position corresponding to the second reflective module 612 of the left eye module is the position of a pupil of the left eye of the user.

The second reflective module 612 can include one or more second reflective elements 200. The second reflective module 612 may be composed of a plurality of the second reflective elements 200, and the reflective surface of the second reflective module 612 is composed of the first surface 201 of the plurality of second reflective elements 200. In an exemplary, the second reflective module 612 includes a plurality of second reflective elements 200, the manner of combination of the second reflective module 612 may refer to the manner of combination of the first reflective module 611 mentioned above, which are not described herein. The plurality of second reflective elements 200 are combined to form the second reflective module 612, and a light from the first reflective module 611 can be superimposed by the reflection of the plurality of second reflective elements 200, so as to the intensity or brightness of the light reflected by the second reflective module 612 is enhanced, and the amplification effect of the image enlargement device 60 can be improved.

It should be noted that, when the second reflective module 612 only includes one second reflective element 200, the optical axis of the second reflective module 612 is the optical axis of the second reflective element 200. When the second reflective module 612 includes a plurality of second reflective elements 200, the optical axis of the second reflective module 612 is an equivalent optical axis of the combination of the plurality of second reflective elements 200. The first reflective module 611 has a different extending direction from the vertical line of an out-light surface of the display 1000, and the optical axis of the first reflective module 611 has a different extending direction from the optical axis of the second reflective module 612.

In some embodiments, a focal power of the first reflective module 611 can be a positive number, a negative number or zero, and a focal power of the second reflective module 612 can be a positive number or a negative number. It should be noted that, when the first reflective module 611 only includes one first reflective element 100, the focal power of the first reflective element 100 is the focal power of the first reflective module 611. When the second reflective module 612 only include one second reflective element 200, the focal power of the second reflective element 200 is the focal power of the second reflective module 612.

Due to the first reflective module 611 and the second reflective module 612 are used, the first reflective module 611 and the second reflective module 612 have various matching manners to meet different demands of users, such as hyperopia and myopia, the image enlargement device 60 can meet the needs of a variety of different user groups.

It can be understood that, when the user is myopia, the first reflective module 611 having a positive focal power combined with the second reflective module 612 having a positive focal power can enlarge the image for the user to clearly view the enlarged image. When the user is hyperopia, the first reflective module 611 having a negative focal power combined with the second reflective module 612 having a negative focal power can enlarge the image for the user to clearly view the enlarged image.

In some embodiments, in order to ensure the first reflective module 611 and the second reflective module 612 can be correctly combined, the focal powers of the first reflective module 611 and the second reflective module 612 satisfy the following condition:

$-0.55 < (\Phi 1 + \Phi 2 - (\Phi 1 * \Phi 2) * d_{12}) < 0.55;$ wherein, $\Phi 1$ is the focal power of the first reflective module 611, $\Phi 2$ is the focal power of the second reflective module 612, and d12 is an equivalent distance between the first reflective module 611 and the second reflective module 612.

The first reflective element 100 and the second reflective element 200 can be manufactured according to the above standard condition, such that the production efficiency is increased and the production cycle is shortened in the process of producing the first reflective element 100 and the second reflective element 200.

In some embodiments, the second reflective module 612 is movably disposed between the display 1000 and the eyes of the user, thereby an imaging position and an imaging effect of the second reflective module 612 can be adjusted. In some embodiments, the first reflective module 611 and the second reflective module 612 are both movably disposed, that is, the first reflective module 611 and the second reflective module 612 are movably disposed between the display 1000 and the eyes of users.

The reflection of the incident light of the image by the first module 611 and the second module 612 realizes the image enlargement effect, at the same time, due to the first reflective module 611 and the second reflective module 612 are movably disposed between the display 1000 and eyes of users, a distance between the first reflective module 611 and the display 1000, a distance between the first reflective module 611 and the second reflective module 612, and a distance between the second reflective module 612 and the viewing position are adjustable. Therefore, the effect of the enlarged image can be real time adjusted and the users experience can be greatly improved.

In order to achieve a movable setting of the first reflective module 611 and the second reflective module 612, in some embodiments, a slide rail for the movement of the first reflective module 611 and the second reflective module 612 can be disposed in a glasses, an eye mask, a mask, or an outer casing, when the image enlargement device 60 is formed into these products. The movable setting of the first reflective module 611 and the second reflective module 612 can be realized by the slide rail. In other embodiments, some shapes such as glasses, eye masks, face masks or products wrapped only by one layer of outer casing may be made into a freely stretchable form, and the movable setting of the first reflective module 611 and the second reflective module 612 are realized by their free expansion and contraction.

The design examples of the first reflective module 611 and the second reflective module 612 of the image enlargement device 60 of the present disclosure are listed below, as shown in Table 1:

TABLE 1

Optical component parameter table

| Face number | Element number | radius | Thickness/distance | Material | inclination relative to human eye axis (degrees) | Cone coefficient K |
|---|---|---|---|---|---|---|
| 1 | display | ∞ | 48 | — | 43 | 0 |
| 2 | First reflective module | ∞ | 2.5 | PMMA | 2 | 0 |
| 3 |  | ∞ | 75 |  |  | 0 |
| 4 | Second reflective module | 595 | 2.5 | PMMA | 21 | −1.02 |
| 5 |  | 590 | 90 |  |  | −2.13 |

A right eye module corresponding to the right eye of user, which is configured to enlarge an image and project the image into the right eye of user. Specifically, the right eye module includes a third reflective module 621 and a fourth reflective module 622, wherein the third reflective module 621 and the first reflective module 611 have same structure, the fourth reflective module 622 and the second reflective module 612 have a same structure, for details, please refer to the foregoing embodiments.

Specifically, the image enlargement device mentioned above can be applied to VR, AR, MR or magnifying glasses, which are described separately as follows.

Figure 8:
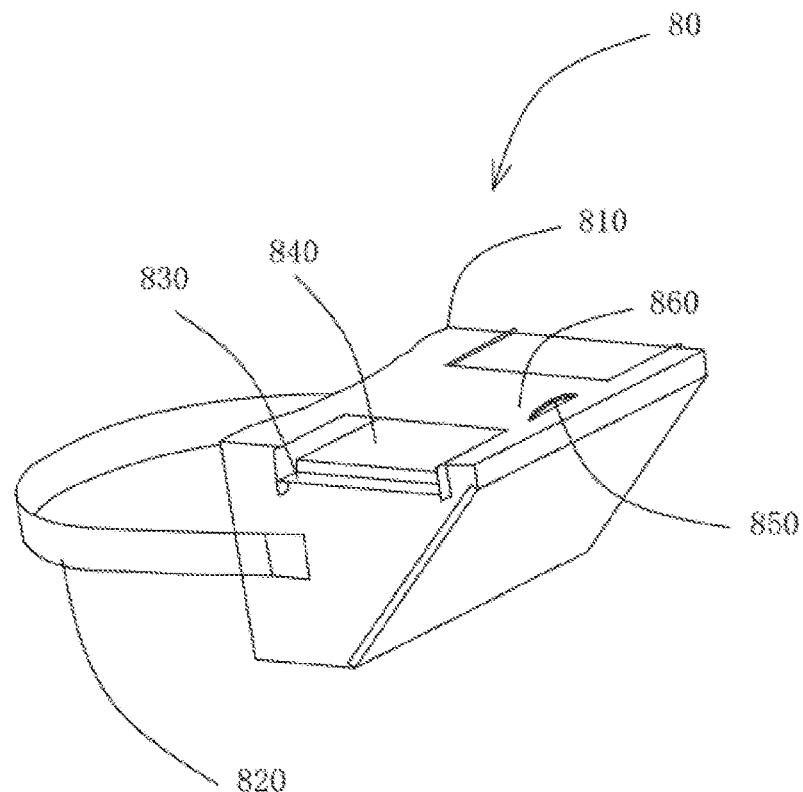
FIG. 8 is a schematic structural diagram of a VR headset according to an embodiment of the present disclosure.

Referring to FIG. 8, a VR headset 80 is illustrated. The headset 80 include a housing 810, an image enlargement device (not shown), and a telescopic belt 820.

The housing 810 defines a mounting groove 830, and the image enlargement device is mounted in the housing 810, wherein a specific implementation manner of the image enlargement device may refer to the foregoing embodiment, and details are not described herein. In some embodiments, the mounting groove 830 is disposed at the top of the housing 810. The mounting groove 830 is configured to mount a display or a terminal device, and a first window (not shown) is provided in the mounting groove 830. In some embodiments, a mobile terminal 840 is disposed in the mounting groove 830. When the virtual reality glasses 80 is used, a display of the mobile terminal 840 faces the first window, an image of the display is input into the interior of the housing 810 through the first window, and then the image is project into the image enlargement device. Specifically, a size of the first window matches a size of the display or a size of the display of the mobile terminal 840.

In some embodiments, the mounting groove 830 is provided with a first blocking piece 860, and the first blocking piece 860 is elastic for fixing the mobile terminal 840 or a display in the mounting groove 830.

In some embodiments, the housing 810 is provided with an adjustment component 850, the image enlargement device may be movably disposed in the housing 810. The adjustment component 850 is configured to adjust the position of the image enlargement device within the housing 810, and users can watch different imaging effects. Specifically, the adjustment component 850 is a gear, the first reflective element 100 and the second reflective element 200 are disposed at a slide rail. The first reflective element 100 and the second reflective element 200 are meshed with the adjustment component 850 by the gear. The gear is adjusted by the rotation of the adjustment component 850, so as to drive the movement of the first reflective element 100 and the second reflective element 200.

Figure 9:
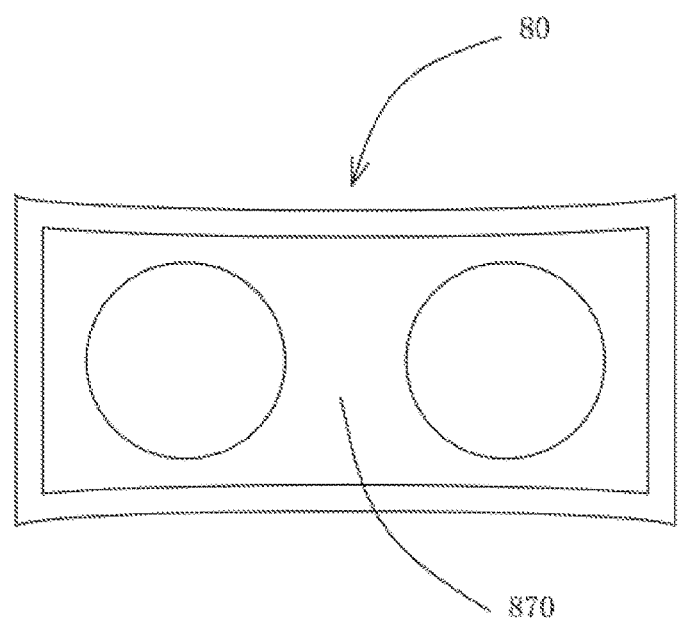
FIG. 9 is a schematic structural diagram of the VR headset according to an embodiment of the present disclosure.

In some embodiments, a second window 870 is defined on the housing 810. As shown in FIG. 9, the second window 870 is disposed at a rear end of the housing 810, which is configured to a viewing window for the user, and a viewing position of the user is at the second window. Then, when the user wearing the virtual reality glasses 80, eyes of the user are located in the second window 870. Due to the user's eyes are located on an extension line of an optical axis of the second reflective element 200, a reflected light can be converged into eyes of the user. At the same time, due to the extension line of the optical axis of the second reflective element 200 does not intersect the extension line of the optical axis of the first reflective element 100, a light reflected by the second reflective element 200 can not enter the first reflective element 100. The light reflected by the second reflecting element 200 into the second window 870 is not blocked by the first reflecting element 100.

The telescopic belt 820 is coupled to the housing 810, and configured to wear the housing 810 on the head of user. The telescopic belt 820 is stretch and can be elastically adjusted as needed.

It should be noted that the second reflective element 200 of the headset 80 can be a total reflection element. That is, the second reflective element 200 may not have a function of transmitting light.

When the user watches the display of the mobile terminal 840, the flow of operating the headset 80 is as follows.

Figure 10:
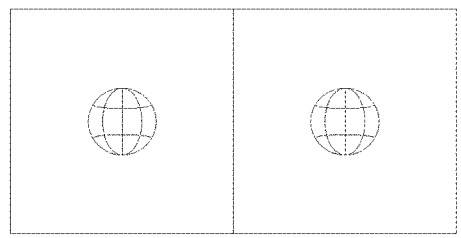
FIG. 10 is a schematic view of a display displayed on a display interface of a mobile terminal of the VR headset according to an embodiment of the present disclosure.

When an interface of the mobile terminal 840 is displayed, the interface will be separated into a left eye interface and a right eye interface. As shown in FIG. 10, the left eye interface is a left image and the right eye interface is a right image.

Figure 11:
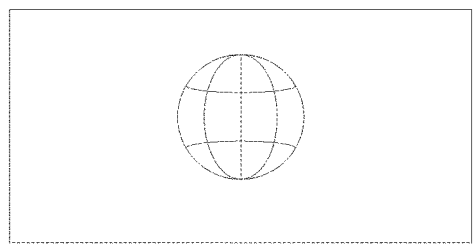
FIG. 11 is a schematic view of a display watched by a user of the VR headset according to an embodiment of the present disclosure.

The mobile terminal 840 is inserted into the mounting groove 830 and a display of the mobile terminal 840 faces the first window described above. The housing 810 is worn over the head by the telescopic belt 820 and eyes of user are located in the second window 870. A positional relationship between the first reflective element 100 and the second reflective element 200 of the image enlargement device can be adjusted by the adjustment component 850, in order to meet the user's requirements for viewing images. Then, an image of the display of the mobile terminal 840 is enlarged by the first reflective element 100 and the second reflective element 200, and the enlarged virtual image can be watched by the user's eyes, as shown in FIG. 11.

Figure 12:
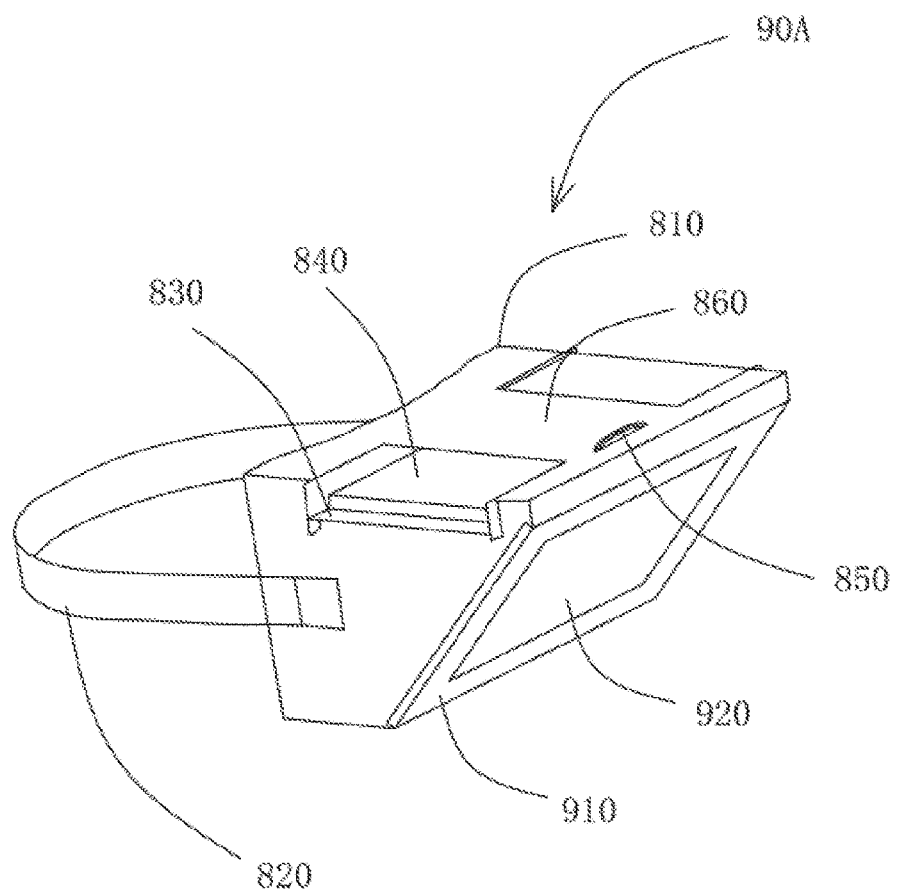
FIG. 12 is a schematic structural view of an AR headset according to an embodiment of the present disclosure.

A block diagram of an AR headset 90A is shown in FIG. 12. The AR headset include a housing 810, an image enlargement device (not shown), and a telescopic belt 820. The housing 810 is provided with a mounting groove 830, a first flap 860, an adjustment component 850, and a second window 870. Specifically, the telescopic belt 820, the mounting groove 830, the first flap 860, the adjusting component 850, and the second window 870 can refer to the foregoing embodiments, and details are not described here again.

Compared to the VR headset 80 described above, the AR headset may include a third window 920 disposed on the housing 810, the third window 920 can be a through opening. In some embodiments, the third window 920 is disposed at a front end 910 of the housing 810. The second reflective element 200) is partially transparent. In some embodiments, the second surface 202 of the second reflective element 200 is opposite to the front end 910 of the housing 810, and the first surface 201 of the second reflective element 200 is opposite to the second window 870. In some embodiments, a fully transparent glass may be disposed on the third window 920. An image of a real-world is directed toward the second surface 202 of the second reflective element 200 through the third window 920, and the image of the real-world is incident into the user's eyes through the second surface 202. In addition, the external reality image is similar to the glasses shown in FIG. 9, the second window 870 is located on an extension line of an optical axis of the second reflective element 200, and the extension line of an optical axis of the second reflective element 200 does not intersect the extension line of an optical axis of the first reflective element 100. Then, a light transmitted through the second reflective element 200 and the reflected lights are not blocked by the first reflective element 100. When eyes of the user are located in the second window 870, the image of the display and the image of the real-world can be watched.

Therefore, an image displayed on a interface of the mobile terminal 840 can be enlarged by the first reflective element 100 and the second reflective element 200. The enlarged image can be combined with the image of the real-world watched through the third window 920 to achieve an effect of augmented reality.

Figure 13:
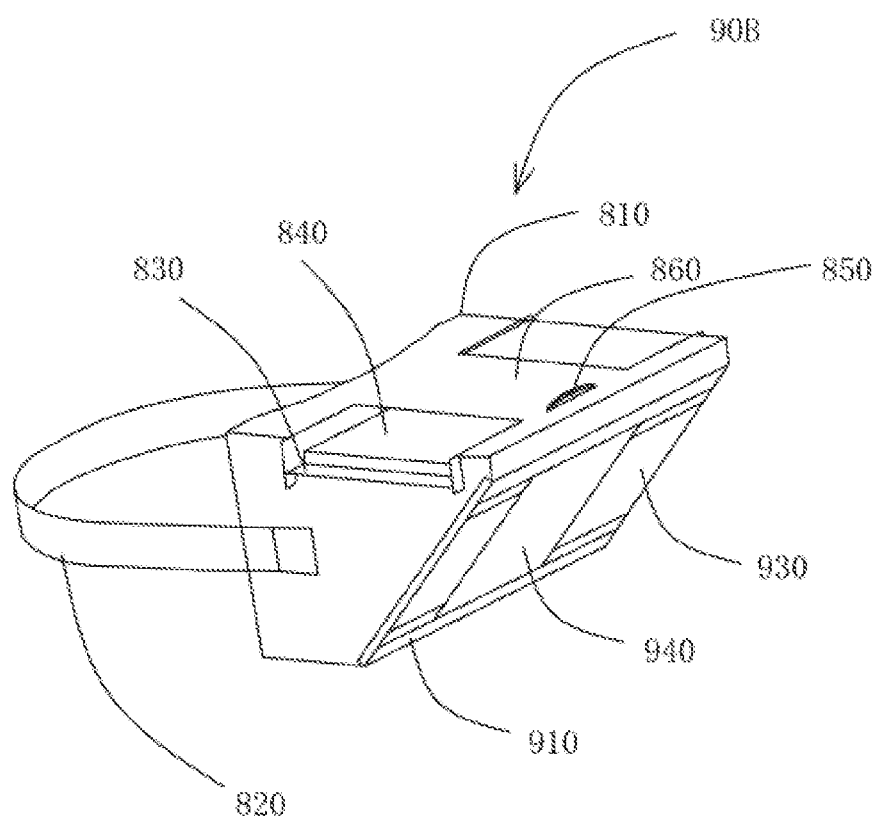
FIG. 13 is a schematic structural view of the AR headset according to another embodiment of the present disclosure.

A block diagram of another augmented reality glasses 90B is shown in FIG. 13. Unlike the augmented reality glasses 90A shown in FIG. 12, a recess 930 is disposed at a front end 910 of the housing 810. The front end 910 is sunken to form the recess 930. The recess 930 is configured to mount a display or mobile terminal 840. A bottom of the recess 930 is provided with a third window 920. The size of the third window 920 matches an interface of the display or an interface of the mobile terminal 840. Contents displayed by the interface of the display or the interface of the mobile terminal 840 can be input through the third window 920 into the second surface 202 of the second reflective element 200. Specifically, when a display is mounted in the recess 930, the display is coupled to an image generating device. In some embodiments, the image generating device may be mounted on the housing 810 or may be used as an external device of the augmented reality glasses to transmit data by wireless or wired means. For example, the image generating device may be a camera or a terminal with an image acquisition function. When the image generating device acquires the image of the real-world, the image of the real-world is sent to a display device by the image generating device, and a display panel of the display device inputs the image of the real-world into the second reflective element 200, and then the second reflective element 200 transmits the image of the real-world into eyes of the user. At the same time, the image displayed by the mobile terminal 840 located in the mounting slot 830 is reflected by the first reflective element 100 and the second reflective element 200, then the image displayed by the mobile terminal 840 is enlarged to an enlarged image. The enlarged image is superimposed with the image of the real-world to achieve an effect of augmented reality.

In addition, the image acquired by the image generating device may also be a digital image, and the image displayed by the mobile terminal 840 located in the mounting groove 830 is reflected by the first reflective element 100 and the second reflective element 200, and then the image displayed by the mobile terminal 840 is enlarged to an enlarged image. The enlarged image is superimposed with the image of the real-world to achieve an effect of mixed reality. In addition, a second blocking piece 940 is disposed on the recess 930. The second blocking piece 940 is configured to block the mobile terminal 840 or a display located in the recess 930.

Similarly, when the mobile terminal 840 such as a mobile phone is installed in the recess 930, a display of the mobile terminal 840 is configured to display the image of the real-world or the digital image. Specifically, when the display is configured to display the image of the real-world, a camera of the mobile terminal 840 is configured to acquire the image of the real-world and then the image of the real-world is displayed by the display of the mobile terminal 840.

In summary, the optical component, the optical system, and the image enlargement device provided by the embodiments of the present disclosure can realize image magnification by reflecting the incident light emitted from the image by the first reflective element and the second reflective element. The image is enlarged by the even reflection of the first reflective element and the second reflective element when viewing a display of a mobile phone or a terminal, thereby improving user experience and comfort. Moreover, the first reflective element is a full-reflective mirror, thus the first reflective element can reduce the attenuation of light energy. The optical component and the optical system do not use a traditional element to enlarged an image, thereby can eliminate the defects of the traditional element, and improve the actual experience of the user. At the same time, in the above reflection process of incident light, the traditional element is not used, thereby the process can avoid using software to process optical aberrations such as a chromatic aberration and a deformation is eliminated. The present disclosure adopts the principle of even reflection, thus can avoid requiring mirror processing by software. Therefore, the present disclosure reduces power consumption and software processing difficulty on the basis of realizing the amplification of the image. Moreover, the second reflective element can be arranged to partially transmit light to reflect the light, so that the optical component can also be used for augmented reality and mixed reality.

In addition, in the optical system, the display, the first reflective element and the second reflective element are disposed along an optical axis of the optical system. When a light coming out of a display is reflected by the first reflective element and the second reflective element, lights transmitted between components of the optical system do not interfere with each other owing to an extension directions of the optical axis is inconsistent, thereby the quality of the enlarged image can be ensured. Due to the extension direction of the optical axis of the first reflective element, the extension direction of the optical axis of the second reflective element, the perpendicular direction of the surface of the display re different from each other, the space occupied by the first reflective element 100 and the second reflective element 200 can be reduced to some extent.

Furthermore, due to the first reflective module and the second reflective module are movably disposed between a display and the eyes of the user, a distance between the first reflective module and the display, a distance between the first reflective module and the second reflective module, and a distance between the second reflective module and the eyes can be adjustable, thereby realizing the real-time adjustment of the magnified image effect, and improving the user experience.

Therefore, the optical component, the optical system, and the image enlargement device provided by the embodiments of the present disclosure have the following technical effects: having the function of enlarging image; providing the effect of virtual reality and improving the actual experience of users; providing the real-time interactive experience and providing the effect of augmented reality: being suitable for various user groups with different vision or different interpupillary distances; providing a smaller overall size; and making the structure be more simple and the cost be more low.

Although the embodiments of the present disclosure have been shown and described, it is understood that the above-described embodiments are merely illustrative and are not to be construed as limiting the scope of the disclosure. The embodiments are subject to variations, modifications, substitutions and variations.

What is claimed is:
1. An optical system, comprising:
a first reflective element, configured to receive an incident light emitted from a display; and
a second reflective element disposed on a reflected light path of the first reflective element, configured to receive the incident light reflected by the first reflective element and reflect the reflected incident light to a viewing position, and the first reflective element and/or the second reflective element having a function of concentrating light;

wherein light emitted from a center point of the display is sequentially relayed by a first incident point of the first reflective element and a second incident point of the second reflective element and then reaches the viewing position, the first incident point is at a position different from that of a center point of the first reflective element, the second incident point is at a position different from that of a center point of the second reflective element, an optical path of the center point of the display, the first incident point, and the second incident point is an optical axis of the optical system, and the display, the first reflective element and the second reflective element are disposed along the optical axis.

2. The optical system of claim 1, wherein the second reflective element is partially transparent.

3. The optical system of claim 2, wherein the second reflective element comprises:
a first surface, configured to receive the incident light reflected by the first reflective element, and reflect the incident light reflected by the first reflective element to the viewing position; and
a first reflective film, disposed on the first surface, wherein the first reflective film can partially reflect a light and partially transmit the light.

4. The optical system of claim 3, wherein the first surface of the second reflective element faces toward a reflective surface of the first reflective element.

5. The optical system of claim 2, wherein the second reflective element comprises a second surface away from the first reflective element, and an anti-reflection coating on the second surface.

6. The optical system of claim 1, wherein shape of the surface of the first reflective element is selected from one of a plane, a spherical surface, and an aspheric surface, and shape of the surface of the second reflective element is selected from a spherical surface and a non-spherical surface.

7. The optical system of claim 6, wherein the shape of the surface of the first reflective element and the shape of the surface of the second reflective element satisfy the following condition:

$$Z = \frac{cy^2}{1 + sqrt(1 - (1+k)c^2y^2)} + a_1y^2 + a_2y^4 + a_3y^6 + a_4y^8 + a_5y^{10} + a_6y^{12} + a_7y^{14} + a_8y^{16};$$

wherein, z is a height of the reflective element, c is a curvature of the reflective element, k is a conic coefficient of the reflective element, y is an aperture of the reflective element, and a1 to a8 are the aspheric high order coefficients of the reflective element.

8. The optical system of claim 1, wherein a horizontal line passing through the center point of the display is a first horizontal line, a horizontal line passing through the first incident point of the first reflective element is a second horizontal line, a horizontal line of the second incident point of the second reflective element is a third horizontal line, a distance between a center point of the display and the first incident point of the first reflective element is a first distance, a distance between the first incident point and the second incident point is a second distance, and a distance between the second incident point and the viewing position is a third distance;

wherein the angle between the surface of the display and the first horizontal line is less than 90 degrees, the first distance ranges from 20 to 60 mm, the second distance ranges from 40 to 100 mm, and the third distance ranges from 70 to 110 mm.

9. The optical system of claim 8, wherein an angle between a normal line at the position of the center point of the display and the first horizontal line is a first angle, an angle between a normal line at a position of the first incident point and the second horizontal line is a second angle, an angle between a normal line at the position of the second incident point and the third horizontal line is a third angle, the first angle, the second angle and the third angle are acute angles, and an angle between the surface of the display and a reflective surface of the first reflective element is equal to the sum of the first angle and the second angle.

10. The optical system of claim 1, wherein a horizontal line passing through the center point of the display is a first horizontal line, a horizontal line passing through the first incident point of the first reflective element is a second horizontal line, a horizontal line of the second incident point of the second reflective element is a third horizontal line, a distance between the center point of the display and the first incident point of the first reflective element is a first distance, a distance between the first incident point and the second incident point is a second distance, and a distance between the second incident point and the viewing position is a third distance;

wherein the surface of the display is perpendicular to the first horizontal line, the first distance ranges from 30 to 90 mm, the second distance ranges from 40 to 100 mm, and the third distance ranges from 70 to 110 mm.

11. The optical system of claim 10, wherein an angle between a normal line at the position of the first incident point and the second horizontal line is a second angle, an angle between a normal line at the position of the second incident point and the third horizontal line is a third angle, the second angle and the third angle are acute angles.

12. An optical system, comprising:
a display; and
an optical component disposed between the display and a viewing position, the optical component comprising:
a first reflective element for receiving an incident light emitted from the display; and
a second reflective element disposed on a reflected light path of the first reflective element, configured to receive the incident light reflected by the first reflective element and reflect the reflected incident light to a viewing position, and the first reflective element and/or the second reflective element having a function of concentrating light;

wherein light emitted from a center point of the display is sequentially relayed by a first incident point of the first reflective element and a second incident point of the second reflective element and then reaches the viewing position, the first incident point is at a position different from that of a center point of the first reflective element, the second incident point is at a position different from that of a center point of the second reflective element, an optical path of the center point of the display, the first incident point, and the second incident point is an optical axis of the optical system, and the display, the first reflective element and the second reflective element are disposed along the optical axis, wherein an out-light surface of the display is perpendicular to a horizontal line passing through the viewing position.

13. The optical system of claim 12, wherein a horizontal line passing through the center point of the display is a first horizontal line, a horizontal line passing through the first incident point of the first reflective element is a second horizontal line, a horizontal line of the second incident point of the second reflective element is a third horizontal line, a distance between a center point of the display and the first incident point of the first reflective element is a first distance, a distance between the first incident point and the second incident point is a second distance, and a distance between the second incident point and the viewing position is a third distance;

wherein the angle between the surface of the display and the first horizontal line is less than 90 degrees, the first distance ranges from 20 to 60 mm, the second distance ranges from 40 to 100 mm, and the third distance ranges from 70 to 110 mm.

14. The optical system of claim 13, wherein the surface of the display is perpendicular to the first horizontal line, the first distance ranges from 30 to 90 mm, the second distance ranges from 40 to 100 mm, and the third distance ranges from 70 to 110 mm.

15. An image enlargement device, comprising:
a left eye module corresponding to a left eye;
a right eye module corresponding to a right eye, wherein each of the left eye module and the right eye module comprises:
a first reflective module is composed of a plurality of first reflective mirrors, adjacent edges of the plurality of first reflective mirrors are bonded together, and reflective surfaces of the plurality of first reflective mirrors constitute a reflective surface of the first reflective module;
a second reflective module is composed of the plurality of second reflective mirrors, and reflective surfaces of the plurality of second reflective mirrors constitute a reflective surface of the second reflective module;
the second reflective module is disposed on a reflected light path of the first reflective module, the second reflective module is configured to reflect a light reflected by the first reflective module to a viewing position of the corresponding eye.

16. The image enlargement device of claim 15, wherein an extension direction of an optical axis of the first reflective module is inconsistent with the vertical direction of a light exit surface of the display, and the extension direction of the optical axis of the first reflective module is inconsistent with the extension direction of the optical axis of the second reflective module.

17. The image enlargement device of claim 15, wherein a focal power of the first reflective module is selected from one of a positive number, a negative number and zero, and a focal power of the second reflective module is selected from a positive number and a negative number.

18. The image enlargement device of claim 15, wherein the focal power of the first reflective module and the focal power of the second reflective module satisfy the following condition:

$$-0.55<(\Phi 1+\Phi 2-\Phi 1*\Phi 2)*d_2)<0.55;$$

wherein, $\Phi 1$ is the focal power of the first reflective module, $\Phi 2$ is the focal power of the second reflective module, d12 is an equivalent distance between the first reflective module and the second reflective module.

19. The image enlargement device of claim 15, wherein the second reflective module is movably set.

20. The image enlargement device of claim 15, wherein the plurality of second reflective mirrors are not in contact with each other and are separated by a specific distance.

* * * * *